United States Patent [19]

Koyanagi et al.

[11] 4,232,141

[45] Nov. 4, 1980

[54] METHOD FOR THE PREPARATION OF VINYL CHLORIDE POLYMERS

[75] Inventors: Shunichi Koyanagi; Hajime Kitamura; Kazuhiko Kurimoto, all of Ibaragi, Japan

[73] Assignee: Shin-Etsu Chemical Co., Ltd., Japan

[21] Appl. No.: 925,704

[22] Filed: Jul. 18, 1978

[30] Foreign Application Priority Data

Jul. 29, 1977 [JP] Japan ................................ 52-91194

[51] Int. Cl.$^3$ .......................... C08F 2/20; C08F 14/06
[52] U.S. Cl. ................................ 526/344.2; 526/86; 526/199; 526/202; 526/209; 526/218; 526/230; 526/230.5; 526/232; 526/232.1; 526/908
[58] Field of Search ............... 526/344.2, 232, 218, 526/908, 86, 232, 199, 202, 209, 230, 230.5, 232.1

[56] References Cited

U.S. PATENT DOCUMENTS

| | | | |
|---|---|---|---|
| 3,451,985 | 6/1969 | Mahlo | 526/86 |
| 3,753,966 | 8/1973 | Koyangi et al. | 526/344.2 |
| 3,790,542 | 2/1974 | Koyangi et al. | 526/344.2 |

*Primary Examiner*—John Kight, III
*Attorney, Agent, or Firm*—McGlew and Tuttle

[57] ABSTRACT

An improved method for the polymerization of vinyl chloride or a monomer mixture mainly composed of vinyl chloride in an aqueous polymerization medium is proposed in which a water-insoluble polymerization initiator, being solid at room temperature as dispersed in the aqueous medium and having a particle size distribution of 50 $\mu$m or finer, is added to the polymerization mixture which is maintained at a temperature where the half-life period of the initiator is 120 minutes or longer or, alternatively, over a duration equal to or shorter than one-tenth of the half-life period of the initiator at the temperature of the polymerization mixture. By this method the polymerization can be homogeneously proceeded to produce vinyl chloride polymers having a uniform particle size distribution, excellent heat stability and much less fish-eyes when fabricated into sheets.

9 Claims, No Drawings

METHOD FOR THE PREPARATION OF VINYL CHLORIDE POLYMERS

BACKGROUND OF THE INVENTION

The present invention relates to an improved method for the preparation of vinyl chloride polymers or, in particular, to an improved method for adding a polymerization initiator to the polymerization mixture in the suspension polymerization of vinyl chloride monomer in an aqueous medium.

A variety of polymerization initiators hitherto known and employed for the polymerization of vinyl chloride include several peroxy dicarbonates, such as diisopropylperoxy dicarbonate, dicyclohexylperoxy dicarbonate, bis(tert-butylcyclohexyl)peroxy dicarbonate and the like; several peresters, such as tert-butylperoxy neodecanoate, tert-amylperoxy neodecanoate and the like; several diacyl peroxides, such as benzoyl peroxide and the like; and several azo or nitrile compounds, such as azobisisobutyronitrile, dimethylvaleronitrile, 4-methoxy-dimethylvaleronitrile, trimethylvaleronitrile and the like, as well as acetylcyclohexylsulfonyl peroxide and others.

These polymerization initiators have different influences on the productivity of the vinyl chloride polymerization and the quality of the resulting polymers. Extensive investigations have been undertaken for each of the polymerization initiators with the object to establish more advantageous manner of application in a commercial scale, along with the knowledge that the conditions under which the polymerization initiators are added to the polymerization mixture, for example, the temperature of the polymerization mixture and the duration over which the polymerization initiators are added to the polymerization mixture, give different effects to them, even to one and the same polymerization initiator.

It has been a recent tendency, for example, that larger and larger polymerization reactors are used in order to obtain improved productivity as well as the stabilization of the qualities of vinyl chloride polymers. Usually in the polymerization using a large polymerization reactor, water forming the aqueous polymerization medium is heated prior to introduction to the reactor in order to shorten the period of time necessary for the elevation of temperature immediately after completion of introduction of all ingredients into the reactor and hence quicken the initiation of the polymerization reaction. In this procedure using the pre-heated water, not all of the above-mentioned polymerization initiators can be used, but a limited member of them are applicable.

In explanation, most of the polymerization initiators having relatively high activity and applicable to the preparation of vinyl chloride polymers are liquid at room temperature, and must be stored at a low temperature, usually below 0° C., in order to avoid decomposition. When such a polymerization initiator is added to the pre-heated aqueous medium in the polymerization reactor, followed by introduction of vinyl chloride monomer, the premature decomposition of the polymerization initiator takes place before it is uniformly dispersed and dissolved into the vinyl chloride monomer, bringing about localized heterogeneous polymerization to the vinyl chloride monomer dispersed in the aqueous medium as fine droplets. As a result, the polymer products have an undesirable wide particle size distribution and a remarkbly increased number of fisheyes in the sheets fabricated therewith.

Trials have been undertaken to mitigate the above-described adverse effects. For example, the polymerization initiator is added to the polymerization mixture under vigorous agitation after the water and the vinyl chloride monomer have been introduced into the polymerization reactor, but no satisfactory results can be obtained due to decomposition reaction occurring to the initiator in the aqueous medium at an elevated temperature before it is dissolved into the monomer phase. As a further example, the polymerization initiator is dissolved in advance in the vinyl chloride monomer, and the initiator-containing vinyl chloride monomer is added to and dispersed in the pre-heated aqueous medium, but this procedure also fails to have satisfactory results due to localized polymerization reaction taking place before the monomer has been uniformly dispersed. In any way, the disadvantages encountered in the prior art techniques have hardly been avoided.

When the polymerization of vinyl chloride is conducted in a relatively small polymerization reactor, the preliminary heating of water as the aqueous medium is not always undertaken, but it is usual that all ingredients are introduced into the polymerization reactor without preliminary heating. Even in such procedure of polymerization, in which the steps of introducing water at room temperature, introducing the polymerization initiator, evacuating the reactor and then introducing the vinyl chloride monomer are successively taken, the decomposition reaction of the polymerization initiator may take place before the introduction of the vinyl chloride monomer is finished, if the polymerization initiator is a liquid one at room temperature, such as acetylcyclohexylsulfonyl peroxide or diisopropylperoxy dicarbonate, leading consequently to disadvantageous results similar to the case where the water is preliminarily heated.

It has been a matter of concern in recent years that, polymerization initiators which are not liquid but solid at room temperature should be used for the polymerization of vinyl chloride, such solid initiators being exemplified by azo compounds, diacetylperoxy dicarbonate, bis-tert-butyl-cyclohexylperoxy dicarbonate and the like. The solid polymerization initiators in general are obtained in the form of lumps, coarse particles or flakes, and have a lower rate of dissolution in vinyl chloride monomer than liquid initiators. Therefore, it has been found difficult to homogeneously dissolve the solid initiators into fine vinyl chloride monomer droplets, resulting in uneven concentration of the initiator within or among the monomer droplets, with the above-discussed disadvantages being hardly eliminated.

It has been proposed that the solid polymerization initiator should be added to the polymerization mixture in the polymerization reactor as dissolved in the vinyl chloride monomer in advance prior to introduction. However, the solid polymerization initiators have activities toward decomposition very much enhanced when dissolved in the monomer to the same extent as is witnessed in the case of the aforementioned highly active liquid polymerization initiators and, hence, the advantages of the solid initiators are almost entirely lost.

In addition, some attempts in which the solid polymerization initiators is added to the polymerization mixture and dissolved in the vinyl chloride monomer at room temperature under vigorous agitation have been found unsuccessful. This is because the polymerization reaction of the monomer begins locally at the points where the polymerization initiator dissolves into the monomer droplets, and a very inhomogeneous polymerization reaction takes place in an extent much higher than in the case wherein the highly active liquid polymerization initiators are used, resulting to bring about the disadvantageous broadened particle size distribution and the increased number of fish-eyes to the resultant polymer products.

In conclusion, there have been discovered no satisfactory techniques for overcoming the disadvantages owned by the relatively highly active polymerization initiators and, on the other hand, for taking advantage of the features of such initiators in the polymerization of vinyl chloride in an aqueous medium.

SUMMARY OF THE INVENTION

It is therefore an object of the present invention to provide an improved method for the preparation of vinyl chloride polymers, in which the above-described problems encountered in the prior art methods are fully overcome.

In accordance with the method of the present invention, which is directed to the polymerization of vinyl chloride monomer or a monomer mixture mainly composed of vinyl chloride in an aqueous polymerization medium in the presence of a water-insoluble polymerization initiator which is solid at room temperature, is characterized by adding the solid polymerization initiator to the polymerization mixture as an aqueous dispersion containing the polymerization initiator having a particle size not exceeding 50 µm. Further, in accordance with the present invention, the solid polymerization initiator in the aqueous dispersion form is added to the polymerization mixture while the polymerization mixture is maintained at a temperature in the range from room temperature to a temperature at which the half-life period of the polymerization initiator is at least 120 minutes. Furthermore, in accordance with the present invention, the addition of the polymerization initiator may be conducted over the duration equal to or shorter than one-tenth of the half-life period of the polymerization initiator at the temperature of the polymerization mixture.

DETAILED DESCRIPTION OF THE PREFERRED EMBODIMENTS

The polymerization initiators useful in the method of the present invention are, as defined above, insoluble to water and solid at room temperature, having a particle size not exceeding 50 µm and, when dispersed in the aqueous polymerization medium, can form a dispersion having a particle size distribution substantially free from particles coaser than 50 µm. Hence, those initiator particles are readily and uniformly dissolved into the droplets of the vinyl chloride monomer which are suspended in the same aqueous medium.

As a consequence, any inhomogenous polymerization of the vinyl chloride monomer can be avoided in the method of the present invention. The polymerization reaction proceeds evenly in the individual droplets of the monomer suspended in the aqueous polymerization medium, leading to a uniform particle size distribution in the resultant vinyl chloride polymer products and a very little occurrence of fish-eyes in fabricated articles.

Further according to the method of the present invention, the aqueous dispersion of the polymerization initiator is added to the polymerization mixture which is maintained at a temperature at which the half-life period of the polymerization initiator is at least 120 minutes or, alternatively, over the duration of time equal to or less than one-tenth of the half-life period of the initiator at that temperature. The addition of the aqueous dispersion of the polymerization initiator to the polymerization mixture under the conditions as set forth above ensures the initiation of the polymerization of vinyl chloride after completion of the uniform dissolution of the polymerization initiator into the monomer droplets, so that the disadvantageously inhomogeneous polymerization reaction can be avoided.

In other words, the method of the present invention can effectively eliminate the undesired inhomogeneous proceeding of the polymerization reaction which has been encountered in the prior art techniques causing the resultant polyvinyl chloride resin to be tinted and reduce its heat stability, as well as to have an inhomogeneous particle size distribution and remarkably increased fish-eye formation due to the local accumulation of excessive polymerization heat.

The method of the present invention is applicable to all types of polymerization of vinyl chloride in an aqueous medium, but especially advantageous when a large polymerization reactor is used. Namely, superior quality polyvinyl chloride resins can be obtained by the polymerization in which a large polymerization reactor is charged with pre-heated water, a dispersing or suspending agent and a vinyl chloride monomer, followed by introduction of the aqueous dispersion of the polymerization initiator in a manner as set forth above and then the temperature of the polymerization mixture is elevated to start the polymerization reaction under agitation.

Illustrative of the polymerization initiators in solid state at room temperature and suitable for use in the method of the present invention are peroxydicarbonates, such as dicyclohexylperoxy dicarbonate, bis-tert-butylcyclohexylperoxy dicarbonate, dimyristylperoxy dicarbonate, dicetylperoxy dicarbonate and the like; diacylperoxides, such as lauroyl peroxide, benzoyl peroxide, octanoyl peroxide, decanoyl peroxide and the like; and azo compounds, such as azobisisobutyronitrile, 2,4-dimethylvaleronitrile, 4-methoxy-2,4-dimethylvaleronitrile and the like.

Among the above-named polymerization initiators, azobisisobutyronitrile and diacyl peroxides, such as lauroyl peroxide, have a relatively low activity and very advantageously suitable when used in the polymerization reaction at a relatively high temperature, say, 60° to 70° C. in order to prepare low molecular weight vinyl chloride polymers. In this regard, it may be added that polymerization initiators having a high-activity are not suitable for use at such high polymerization temperatures. The polymerization reaction wherein low-activity initiators are used usually proceeds in a manner similar to the case wherein high-activity initiators are used at a lower polymerization temperature, say, 50° to 60° C. It can be said that the advantages proper to the method of the present invention are not fully obtained when the polymerization reaction is carried out at such lower temperature.

The aqueous dispersion of the particles of the polymerization initiator can be obtained by merely putting the particles in a portion of water to disperse therein when they have a size equal to 50 µm or smaller, or by dispersing them in water after they are ground in water or other inert solvents at 0° C. or below, using a pulverizing means, such as a ball mill, hammer mill, attriter or a colloid mill, so as to reduce their size to well below 50 μm, when they have a larger size.

In the process of dispersing the polymerization initiator into water, it is optional to use a dispersing agent according to need in order to stabilize the dispersion. The dispersing agents for the purpose are preferably the same that are used as the suspending agent in the suspension polymerization of vinyl chloride in an aqueous medium. Their examples are gelatine, partially saponified polyvinyl alcohols and water-soluble cellulose derivatives, such as cellulose ethers. A typical aqueous dispersion of the polymerization initiator preferably contains 50% by weight or less of the polymerization initiator and 10% by weight or less of the dispersing agent based on the weight of the polymerization initiator. If any particles of the polymerization initiator which are coarser than 50 μm are contained in the aqueous dispersion, they should be removed by passing the dispersion through a screen of suitable mesh openings.

The method of the present invention can be applied not only to the homopolymerization of vinyl chloride but also to the copolymerization of a monomer mixture mainly composed of vinyl chloride and one or more comonomers, such as vinyl esters, vinyl ethers, esters of acrylic and methacrylic acids, α-olefins, aromatic vinyl compounds, vinyl halides other than vinyl chloride, vinylidene halides and esters of maleic and fumaric acids, the amounts of these comonomers in the monomer mixture being usually 30% by weight or less.

The polymerization procedure in accordance with the method of the present invention can be performed in the same manner as conventional for the suspension polymerization of vinyl chloride in an aqueous medium, in all aspects except for the type of the polymerization initiator and the method of adding the initiator to the polymerization mixture. Thus, for example, the dispersing agent or suspending agent to be used may be a conventional water-soluble polymeric substance in an appropriate amount without any specific limitations.

In the following, the method of the present invention will be illustrated in further detail by way of several examples. In the examples, the abbreviated expressions of certain polymerization initiators are as follows.

LPO: lauroyl peroxide
DPO: decanoyl peroxide
DMVN: 2,4-dimethylvaleronitrile
MDVN: 4-methoxy-2,4-dimethylvaleronitrile
CHPC: dicyclohexylperoxy dicarbonate
BHPC: bis-tert-butylcyclohexylperoxy dicarbonate The temperatures at which the half-life periods of the above-named polymerization initiators are equal to 120 minutes as measured in a toluene solution of 0.1 to 0.2 mole/liter concentration. The half-life period of each polymerization initiator measured at 50°, 55° and 60° C. are set forth in Table I.

TABLE I

| Polymerization initiator | Temperature °C. | Half-life period, min, at: | | |
|---|---|---|---|---|
| | | 50° C. | 55° C. | 60° C. |
| LPO | 75 | — | 1,500 | 750 |
| DPO | 75 | — | 1,500 | 750 |
| DMVN | 60 | 600 | 240 | 120 |
| MDVN | 44 | 50 | 28 | 13 |
| CHPC | 55 | 252 | 126 | 60 |
| BHPC | 55 | 240 | 120 | 58 |

Further in the examples, the number of fish-eyes and the value of heat stability of the polyvinyl chloride products were determined by the following procedures. In the descriptions of the procedures and the examples parts and percentages (%) are all by weight.

DETERMINATION OF FISH-EYES

A mixture consisting of 100 parts of each polymer under testing, 50 parts of dioctyl phthalate, 0.6 part of tribasic lead sulfate, 2 parts of lead stearate, 0.02 part of titanium dioxide and 0.01 part of carbon black was kneaded on hot two-roll mill with the roll gap of 0.2 mm at 140° C. for 5 minutes, and shaped into a sheet 0.2 mm thick. Then the number of transparent particles present in the sheet was counted, and the number so counted per 100 cm$^2$ of the sheet was recorded as the number of fish-eyes.

DETERMINATION OF HEAT STABILITY

A mixture consisting of 100 parts of each polymer, under testing, 2.0 parts of an organotin mercaptide and 1 part of stearic acid was kneaded on a hot two-roll mill with the roll gap of 0.7 mm at 160° C. for 5 minutes, and shaped into a sheet 0.8 mm thick. Then the sheet was subjected to heating in an air oven at 180° C. and the time taken to have it blackened was recorded in minutes as the value of heat stability.

EXAMPLE 1

An aqueous dispersion of DMVN to be used in this example was prepared as follows. Granular DMVN was twice passed through a turbomill rotating at 5,000 r.p.m. with a stream of chilled air at 0° C., and the resultant pulverized DMVN was dispersed under strong agitation at 20° C. into water that contained 4% of a polyvinyl alcohol having an average degree of polymerization of about 1,800, to form an aqueous dispersion containing 40% of DMVN. This aqueous dispersion was further passed through a 2-liter capacity colloid mill, to form a stable dispersion of finely divided DMVN, which was then kept standing at 17° C. for 20 hours in a glass vessel. Thereupon the dispersion was deprived of trace amounts of coarser DMVN particles settled at the bottom of the glass vessel, and its solid content was adjusted to 30% by adding a suitable volume of water. The particle size of DMVN in this dispersion was 2 μm was measured by the light scattering technique.

Into a 100 liter capacity polymerization reactor of stainless steel was introduced 50 kg of water containing 25 g of a polyvinyl alcohol dissolved therein and, while the resultant aqueous medium was maintained at the varied temperatures as indicated in Table II, 25 g of the above prepared 30% DMVN aqueous dispersion was added. The polymerization reactor was then evacuated of air, and 25 kg of vinyl chloride monomer was introduced. After 5 minutes of preliminary stirring, the temperature of the polymerization mixture was adjusted at 60° C. to effect the polymerization of the vinyl chloride monomer. The polymerization reaction was terminated when the inside pressure of the reactor dropped to 6.0 kg/cm$^2$G.

In each experiment, the time from the beginning of the introduction of the initiator dispersion to the start of monomer introduction was 20 minutes, including about 5 minutes required for the introduction of the dispersion, while the overall time from the beginning of the introduction of the initiator dispersion to the time when the temperature of the polymerization mixture reached 60° C. was 40 to 50 minutes, depending on the temperature at which the aqueous medium was preheated.

The vinyl chloride polymers produced had an average degree of polymerization of about 850, and exhibited their properties as set out in Table II.

TABLE II

| Experiment No. | Present invention | | | Control | |
|---|---|---|---|---|---|
| | 1 | 2 | 3 | 4 | 5* |
| Temperature of the aqueous medium | 50 | 55 | 60 | 65** | 50 |
| Particle size distribution, %, passing through a screen of: | | | | | |
| 60 mesh | 99.8 | 99.8 | 98.9 | 95.1 | 89.2 |
| 100 mesh | 61.1 | 62.0 | 55.3 | 40.6 | 23.9 |
| 200 mesh | 1.2 | 0.9 | 2.4 | 3.6 | 5.3 |
| Number of fish-eyes | 8 | 10 | 25 | 153 | >200 |
| Heat stability, min. | 100 | 100 | 95 | 85 | 85 |

Notes:
*In this experiment 7.5 g of granular DMVN as such (not dispersed in water) was used.
**The DMVN used had a half-life period of 65 minutes.

EXAMPLE 2

Into a 1000-liter capacity polymerization reactor of stainless steel was introduced 500 kg of water containing 160 g of a polyvinyl alcohol and 40 g of a methylcellulose dissolved therein which was pre-heated to 55° C. and, while the temperature was maintained at that temperature, the polymerization reactor was evacuated of air, followed by introduction of a small amount of vinyl chloride monomer, whereby the pressure inside the reactor increased to atmospheric.

Then, 750 g of an aqueous dispersion containing 10% of BHPC with a particle size distribution of not exceeding 10 μm prepared in a similar manner to Example 1 by use of polyvinyl alcohol in an amount of 10% based on the BHPC and 250 kg of vinyl chloride monomer were introduced into the reactor simultaneously but separately by individual pumps and, after 5-minute preliminary stirring, the temperature of the polymerization mixture was elevated to 56° C., to carry out polymerization reaction until the pressure inside the reactor dropped to 5.5 kg/cm²G. In each experiment, the time spent till vinyl chloride was introduced was 25 to 30 minutes, including from 2 to 15 minutes spent in the introduction of the initiator, as indicated in Table III, and the time from the beginning of the introduction of the initiator to the moment when the temperature reached 56° C. was 50 to 60 minutes.

The properties of the polyvinyl chloride products obtained and some other conditions of control experiments are set out in Table III.

TABLE III

| Experiment No. | Present invention | | | Control | | | |
|---|---|---|---|---|---|---|---|
| | 6 | 7 | 8 | 9 | 10* | 11** | 12*** |
| Time spent in the introduction of initiator, min. | 2 | 5 | 10 | 15 | 5 | 5 | 5 |
| Particle size distribution, % passing through a screen of: | | | | | | | |
| 60 mesh | 100 | 100 | 99.8 | 89.6 | 75.6 | 80.3 | 82.6 |
| 100 mesh | 58.5 | 60.1 | 62.5 | 51.5 | 35.5 | 61.2 | 52.6 |
| 200 mesh | 0.8 | 1.0 | 1.2 | 3.6 | 5.2 | 4.5 | 3.9 |
| No. of fish-eyes | 20 | 15 | 19 | >200 | >200 | 119 | 123 |
| Heat stability, | | | | | | | |

TABLE III-continued

| Experiment No. | Present invention | | | Control | | | |
|---|---|---|---|---|---|---|---|
| | 6 | 7 | 8 | 9 | 10* | 11** | 12*** |
| min. | 125 | 125 | 120 | 115 | 105 | 110 | 110 |

Notes:
*In this experiment, BHPC used in an amount of 75 g had a particle size such that more than 50% was retained on a 42-mesh screen.
**In this experiment, BHPC used in an amount of 75 g was in the form of a 10% solution in toluene.
***In this experiment, BHPC was replaced with 75 g of 2-ethylhexylperoxy dicarbonate in the form of a 15% solution in toluene.

The coloring of the above polymer products was examined of the sheets prepared by mixing 100 parts of each of the polymers with 1.5 parts of lead stearate, 0.5 part of lead tribasic sulfate, 0.5 part of stearic acid and 10 parts of calcium carbonate and kneading the resultant mixture on a hot roller mill at 180° C. for 10 minutes. The results showed that the sheets prepared with the polymers of Experiments Nos. 9 to 12 were apparently pale red when compared with those of Experiments Nos. 6 to 8.

EXAMPLE 3

The same experimental procedures were repeated as in Example 2 except that aqueous dispersions of BHPC were replaced with aqueous dispersions of CHPC prepared by use of polyvinyl alcohol in an amount of 15% based on CHPC. The CHPC used had a particle size as indicated in Table IV.

The temperature of the aqueous medium in the polymerization reactor when the CHPC dispersion was introduced was 50° C., and the time taken for the introduction of the CHPC dispersion was 7 minutes in each polymerization. The properties of the resulting polymer products are set out in Table IV.

TABLE IV

| Experiment No. | Present invention | | Control |
|---|---|---|---|
| | B | 14 | 15 |
| Particle size of CHPC, μm | <12 | <39 | <105* |
| Particle size distribution, %, passing through a screen: | | | |
| 60 mesh | 99.9 | 100 | 91.3 |
| 100 mesh | 61.3 | 60.9 | 62.2 |
| 200 mesh | 0.8 | 1.4 | 2.3 |
| Number of fish-eyes | 18 | 21 | 96 |

*More than 28% was retained on a screen of 74 μm mesh openings.

EXAMPLE 4

The experimental procedure was the same as in Example 2 except that the aqueous dispersion of the initiator was an aqueous dispersion of MDVN used in an amount of 1750 g containing 10% of MDVN with a particle size distribution not exceeding 30 μm prepared by use of a methylcellulose as the dispersing agent in an amount of 6% based on MDVN and that the polymerization was carried out at 45° C. and terminated when the pressure had dropped to 2.5 kg/cm²G. The temperature of the aqueous medium at the introduction of vinyl chloride monomer was 50° C. The temperature of the medium at the introduction of the MDVN dispersion, the time taken for the introduction of the MDVN dispersion and the properties of the polyvinyl chloride products obtained are set out in Table V.

TABLE V

| Experiment No. | Present invention | | | Control | |
|---|---|---|---|---|---|
| | 16 | 17 | 18 | 19 | 20 |
| Temperature of the aqueous medium, °C. | 30 | 40* | 44 | 50 | 45 |
| Time taken for MDVN introduction, min. | 15 | 15 | 7 | 15 | 15 |
| Particle size distribution, %, passing through a screen of: | | | | | |
| 60 mesh | 98.5 | 99.0 | 99.6 | 83.9 | 96.6 |
| 100 mesh | 51.2 | 55.5 | 60.2 | 54.9 | 57.6 |
| 200 mesh | 2.0 | 1.9 | 2.1 | 5.6 | 4.8 |
| No. of fish-eyes** | 15 | 13 | 16 | >200 | 163 |

Notes:
*MDVN used had a half-life period of 240 minutes at 40° C.
**Determined using such sheets that were prepared by a roller mill heated at 150° C.

The coloring of the polymer prepared was examined in the same manner as in Example 2. As a result, the polymers of Experiments Nos. 16 and 17 were found light yellow, while those of Experiments Nos. 18 to 20 were colored light brown.

EXAMPLE 5

The same procedure as in Example 1 was repeated except that the aqueous dispersion of DMVN was replaced with 60 g of an aqueous dispersion containing 20% of LPO with a particle size distribution of not exceeding 5 μm prepared by use of a polyvinyl alcohol in an amount of 10% based on LPO.

The polyvinyl chloride product thus obtained totally passed through a 60-mesh screen, and the occurrence of fish-eyes resulted in 10 pieces.

In comparison, the aqueous dispersion of LPO was replaced with 12 g of powdered LPO having a particle size distribution such that 63% fraction passed through a scrren of 250 μm mesh openings. As a result, polymer products had a particle size distribution of 45.6% fraction passing through a 60-mesh screen and the number of fish-eyes was 151 pieces.

EXAMPLE 6

The same procedure as in Example 5 was repeated except that the aqueous dispersion of LPO was replaced with 30 g of an aqueous dispersion containing 40% of DPO with a particle size distribution of 5 μm or finer prepared by use of a polyvinyl alcohol as the dispersing agent. The resultant polyvinyl chloride product with a particle size distribution such that 99.2% fraction passed through a 60-mesh screen had an average degree of polymerization of about 850 and the number of fish-eyes of 12 pieces. The heat stability of the same product as expressed by the time in which the test sheet was blackened was 148 minutes.

In comparison, the aqueous dispersion of DPO was replaced with 12 g of powdered DPO having a particle size distribution such that 23% fraction passed through a screen of 250 μm mesh openings. As a result, polymer products had a particle size distribution of 50.1% fraction passing through a 60-mesh screen and the number of fish-eyes was 123 pieces. The heat stability of the same product similarly determined was 115 minutes.

What is claimed is:

1. In a method for the polymerization of vinyl chloride monomer or a monomer mixture mainly composed of vinyl chloride dispersed in an aqueous polymerization medium containing a water-soluble suspending agent as dissolved therein and in the presence of a water-insoluble polymerization initiator which is solid at room temperature, the improvement comprising the steps of:
   (a) first grinding coarser particles of the polymerization initiator in an aqueous medium containing a dispersing agent to form an aqueous dispersion of the polymerization initiator having a particle size not exceeding 50 μm, and then
   (b) introducing the aqueous dispersion of the polymerization initiator into the aqueous polymerization medium for the polymerization of the monomer or monomers over a duration equal to or less than one-tenth of the half-life period of the polymerization initiator at the temperature of the polymerization mixture while the polymerization mixture is maintained at a temperature in the range of from room temperature to a temperature which which the half-life period of the polymerization initiator is at least 120 minutes.

2. The method as claimed in claim 1, wherein the water-insoluble polymerization initiator which is solid at room temperature is dicyclohexylperoxy dicarbonate.

3. The method as claimed in claim 1, wherein the water-insoluble polymerization initiator which is solid at room temperature is bis-tert-butylcyclohexylperoxy dicarbonate.

4. The method as claimed in claim 1, wherein the water-insoluble polymerization initiator which is solid at room temperature is lauroyl peroxide.

5. The method as claimed in claim 1, wherein the water-insoluble polymerization initiator which is solid at room temperature is decanoyl peroxide.

6. The method as claimed in claim 1, wherein the water-insoluble polymerization initiator which is solid at room temperature is 2,4-dimethylvaleronitrile.

7. The method as claimed in claim 1, wherein the water-insoluble polymerization initiator which is solid at room temperature is 4-methoxy-2,4-dimethylvaleronitrile.

8. The method as claimed in claim 1, wherein the water-insoluble polymerization initiator which is solid at room temperature is selected from the group consisting of dimyristylperoxy dicarbonate, dicetylperoxy dicarbonate, benzoyl peroxide, octanoyl peroxide and azobisisobutyronitrile.

9. The method as claimed in claim 1, wherein the dispersing agent is a polyvinyl alcohol, a cellulose ether, gelatine or a mixture thereof.

* * * * *